122,591

UNITED STATES PATENT OFFICE.

SAMUEL FILBERT, OF PHILADELPHIA, PENNSYLVANIA.

IMPROVEMENT IN CONCRETE PAVEMENTS.

Specification forming part of Letters Patent No. 122,591, dated January 9, 1872.

*To all whom it may concern:*

Be it known that I, SAMUEL FILBERT, of Philadelphia, in the county of Philadelphia and in the State of Pennsylvania, have invented certain new and useful Improvements in Street-Pavements, &c.; and do hereby declare that the following is a full, clear, and exact description thereof.

My invention consists of a new combination of material for paving streets, parks, walks, stables, cellars, &c., properly vulcanized by the use of sulphur, sulphuric acid, lime, or cement, so as to form a perfect concrete composition. The nature of my combination consists of such an admixture and of such a combination of material as to produce a pavement of great durability and at once be ready for general use, and one that is not affected by heat or cold, will not crumble, but remains hard, elastic, and durable. Difficulties have been experienced in the use of the known compositions for pavements in view of the want of their proper vulcanization, and hence their liability to soon disintegrate, crack, and crumble, and become, under heat, so soft as to allow the wheels of vehicles and weights of bodies to press into the composition to such an extent as to mar the appearance of the pavement, make ruts, and track the sticking matter into houses, &c. By my invention these difficulties are effectually obviated, and a pavement is formed which will in all weather be perfectly smooth, sufficiently hard, and yet contain enough elasticity as not to affect the hoofs of the animals passing over it.

To form my pavement I first prepare the earth on the street or walks by proper grading, after which I smooth the bed by heavy rollers or otherwise, and I then prepare what I term a substratum. I prepare a mortar made of sand, water, and lime, or sand, water, and any hydraulic cement, or any other mortar that will make a perfect and tenacious cement. This is spread upon the earth already prepared, and I then take broken stone or rough gravel, or both, and place the same on the mortar until a base from two to four inches thick is formed, and I then apply additional mortar and work the stone and gravel in until a conglomerate mass is formed, so that the stone and mortar or cement effectually and tenaciously adhere together. This substratum I prefer to roll, so as to make a perfectly smooth surface to more effectually connect the parts. The object of this is to form a solid and durable foundation that improves by time, and becomes harder every year, a desideratum that has long been desired in composition pavements. After the base thus formed is properly set by becoming dry I prepare my composition to place upon the top thereof. This composition is prepared by taking coal-tar and distilling it down to a proper consistency, to which is added about one-eighth to one-quarter of Trinidad or Cuban asphalt. The entire mass is boiled down until the asphalt is thoroughly melted or dissolved, when a suitable quantity of sulphur, sulphuric acid, lime, or cement is added thereto. For instance: to make a barrel of the composition there would be from about three-quarters to seven-eighths of the distillate of coal-tar, from about one-eighth to one-quarter of the asphalt, and about two pounds of sulphur, and about the same of cement or lime; but I do not wish to confine myself to any proportions, as they may be varied and regulated to suit. To this I add heated sand or gravel and small broken stone or stone-dust, so as to form a mass with a consistency about equal to that of heavy sugar. This is then spread over the already-prepared base while hot and rolled with a heated or other rollers until the mass is smooth and cold, after which the pavement is ready for use. The composition may be suitably top-dressed by any hydraulic cement of any colors desired for the purpose of protecting and beautifying the same. For walks and like places the specific foundation herein described may be omitted, and the concrete surface may be cut into flaggings of any size and shape.

Having thus fully described my invention, what I claim as new, and desire to secure by Letters Patent, is—

1. The substratum of a pavement composed of broken stone or gravel, or both, worked with a mortar or cement, substantially as and for the purposes herein set forth.

2. The combination, in a pavement, of a substratum composed of broken stone or gravel, or both, placed upon and worked together with a suitable mortar or any hydraulic cement, and covered with a concrete mixture composed of any suitable materials, substantially as and for the purposes herein set forth.

3. The combination, in a pavement, of a base or substratum, substantially as herein specified, and a vulcanite composition, substantially as set forth.

In testimony that I claim the foregoing I have hereunto set my hand this 2d day of November, 1871.

SAM. FILBERT.

Witnesses:
CHAS. E. PANCOAST,
GEORGE W. JACOBS. (110)